(No Model.)

W. S. ALLEN.
COW TAIL HOLDER.

No. 263,831. Patented Sept. 5, 1882.

Attest:
Walter Donaldson
L. W. Luly

Inventor
Walter S. Allen,
by
Ellis Spear
Att'y.

UNITED STATES PATENT OFFICE.

WALTER S. ALLEN, OF ATTLEBOROUGH, MASSACHUSETTS.

COW-TAIL HOLDER.

SPECIFICATION forming part of Letters Patent No. 263,831, dated September 5, 1882.

Application filed May 3, 1882. (No model.)

*To all whom it may concern:*

Be it known that I, WALTER S. ALLEN, of Attleborough, in the county of Bristol and State of Massachusetts, have invented a new and useful Improvement in Cow-Tail Holders; and I do hereby declare that the following is a full, clear, and exact description of the same.

My invention relates to an improvement in devices to be applied to cows while being milked, in order to prevent their unpleasant and dangerous custom of switching their tails; and the invention consists in combining with two independent pairs of jaws or clamps a pair of connecting-springs which tend to force such jaws together, but which yield to pressure to permit the jaws to open to a greater or less extent, according to the pressure applied.

Figure 2:
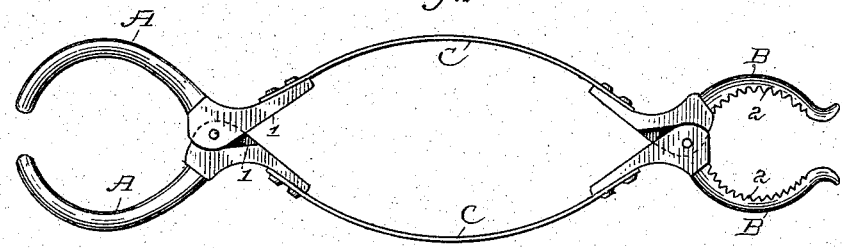
Figure 1:
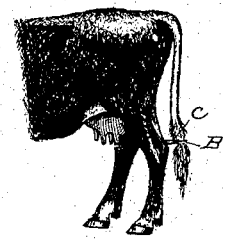

In the drawings, Figure 1 is a view of the device applied to the hind leg and tail of a cow, and Fig. 2 is a plan view.

A A represent curved jaws, which are riveted together by a pivot-pin which passes through the flattened adjoining shanks of the said jaws and permits them to move freely, so as to bring the ends 1 1 of the jaws nearly in contact. The style of joint, however, is immaterial, it being only necessary that the two jaws shall be pivoted together, so that the two jaws can be made to approach and recede. When in their normal position the jaws inclose a nearly circular opening large enough to surround the hock loosely, but not tight enough to cause any discomfort to the animal.

The holder for the tail is composed of jaws B B, of substantially the same construction as A A, but preferably smaller. These jaws are, moreover, provided with serrations or notches 2 2, which hold the hairy portion of the tail.

The jaws A A B B are connected by oppositely-placed flat steel springs C C, which are curved outward to a bow shape, and are riveted to the inner ends of the pivoted shanks, and by a constant pressure outward force the ends of the jaws together. When the springs are grasped by the hand, however, and pressed toward each other the jaws will be forced apart. The jaws A A are then placed loosely around the hock of one of the hind legs, while the hairy portion of the tail is inclosed by the serrated jaws B B. The jaws A A do not press with sufficient tightness to give the animal any discomfort, while they are prevented from slipping down the leg by the rigid hold of the jaws B B on the hairy portion of the tail. It is thus rendered impossible for the cow to switch her tail in the eyes, and one great source of discomfort in milking is thereby done away with.

Having thus described my invention, what I claim is—

1. The combination of hinged or pivoted jaws A A B B with elastic connecting-pieces C C, as described.

2. A cow-tail holder consisting of jaws A A, pivoted together, and adapted to the hock of the hind leg, jaws B B, similarly pivoted together, and adapted to inclose and hold the tail, and bow-shaped springs C C, adapted to close such jaws, but capable of yielding to pressure to permit such jaws to be opened.

In testimony whereof I have signed my name to this specification in the presence of two subscribing witnesses.

WALTER S. ALLEN.

Witnesses:
J. E. POND, Jr.,
A. L. ALLEN.